(12) United States Patent
Sezaki

(10) Patent No.: US 6,816,202 B1
(45) Date of Patent: Nov. 9, 2004

(54) PICTURE FRAME GENERATING CIRCUIT AND DIGITAL TELEVISION SYSTEM USING THE SAME

(75) Inventor: Isao Sezaki, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 475 days.

(21) Appl. No.: 09/671,151

(22) Filed: Sep. 28, 2000

(30) Foreign Application Priority Data

Sep. 29, 1999 (JP) ............................................ 11-276814

(51) Int. Cl.⁷ .......................... H04N 5/04; H04N 5/445
(52) U.S. Cl. ...................... 348/511; 348/564; 345/788
(58) Field of Search ................................ 348/511, 563, 348/564, 565, 569, 570, 580; 345/781, 784, 788, 797, 798, 559, 799, 800, 801, 806, 807; H04N 5/445, 5/04

(56) References Cited

U.S. PATENT DOCUMENTS

| | | | | |
|---|---|---|---|---|
| 4,694,288 A | * | 9/1987 | Harada | 345/790 |
| 4,710,761 A | * | 12/1987 | Kapur et al. | 345/790 |
| 5,047,755 A | * | 9/1991 | Morita et al. | 345/28 |

FOREIGN PATENT DOCUMENTS

| | | |
|---|---|---|
| CA | 1212490 | 10/1986 |
| CA | 1257719 | 7/1989 |
| JP | 2-82765 | 3/1990 |
| JP | 5-204374 | 8/1993 |
| JP | 5-207368 | 8/1993 |
| JP | 5-346773 | 12/1993 |
| JP | 6-268908 | 9/1994 |
| JP | 7-160237 | 6/1995 |
| JP | 8-297481 | 11/1996 |
| JP | 9-91114 | 4/1997 |
| JP | 10-322619 | 12/1998 |
| JP | 11-32273 | 2/1999 |

* cited by examiner

*Primary Examiner*—Michael H. Lee
(74) *Attorney, Agent, or Firm*—Foley & Lardner LLP

(57) ABSTRACT

A picture frame generating circuit has: a coordinate value calculation processor that calculates frame start position (X, Y), picture end position (X, Y), frame end position (X, Y) using calculation start signal as activation signal, based on picture position (X, Y) registers, picture size (X, Y) registers and frame size register which are written through a data bus, the processor allowing frame color data to be written into frame color register to designate the color of frame through the data bus: and a selection circuit of frame and picture to which the frame start position (X, Y), picture end position (X, Y), frame end position (X, Y), picture position (X, Y) registers, frame color data, picture data, horizontal display position and vertical display position are input, the circuit selecting the picture data or frame color data and outputs the selected one as display data.

6 Claims, 9 Drawing Sheets

| SELECT SIGNAL / OUTPUT | 808 | 809 | 810 | 811 |
|---|---|---|---|---|
| 818 | 0 | 0 | 0 | 0 |
| 28-1 | 1 | 0 | 0 | 0 |
| 13 | X | 1 | 0 | 0 |
| 28-2 | X | X | 1 | 0 |
| 818 | X | X | X | 1 |

FIG.10

| SELECT SIGNAL / OUTPUT | 812 | 813 | 814 | 815 |
|---|---|---|---|---|
| 818 | 0 | 0 | 0 | 0 |
| 28-3 | 1 | 0 | 0 | 0 |
| 819 | X | 1 | 0 | 0 |
| 28-4 | X | X | 1 | 0 |
| 818 | X | X | X | 1 |

PICTURE FRAME GENERATING CIRCUIT AND DIGITAL TELEVISION SYSTEM USING THE SAME

FIELD OF THE INVENTION

This invention relates to a picture frame generating circuit and a digital television system using the picture frame generating circuit.

BACKGROUND OF THE INVENTION

In digital televisions, it is desired that multiple moving pictures are simultaneously displayed and the relative position of multiple moving pictures is instantaneously changed.

Also, it is desired that the moving picture is displayed overlapping with graphics such as a still picture and a frame is formed around the moving picture. The position of moving picture is to be optional. Also, the size of frame is to be optional.

Japanese patent application laid-open No.8-297481 (1996) discloses a graphic image display unit that a sub-image is framed when it is displayed in a main image. In this display unit, bit maps for frame and main image are stored in its memory. Referring to the memory simultaneously when scanning the image, if it corresponds to a frame then the frame is displayed, if to a main image then the main image is displayed, else a sub-image in its image memory is displayed. However, a capacity of memory equal to the image size is needed and a large amount of data renewal is needed when the position of frame, sub-image and main image is changed. Therefore, this display unit is not suitable for use in high resolution.

Japanese patent application laid-open No.6-268908 (1994) discloses a multi-image frame signal generating circuit. In this circuit, in calculating the frame when multiple images line up in the horizontal direction, the comparison of frame start point and end point in the horizontal direction and the comparison of frame start point and end point in the vertical direction are conducted. When the scan line corresponds to the start point in the horizontal direction, the coordinates of a next frame are read from its memory. When the scan line further goes on and corresponds to the coordinates of the next frame, the coordinates of a frame after the next are read from the memory. Thus, in this circuit, the position (coordinates) of frame is stored in RAM, and values stored in RAM are sequentially read to detect the position of frame. However, when the position of a moving picture is instantaneously changed, even for the framed image shifted by one pixel, it is necessary to change the four values stored in RAM. When sub-images with the same size line up in the horizontal direction, the frame positions only have to be sequentially read from the memory and compared. However, when they are deviated each other in the vertical direction or when the sizes of sub-images are different each other, it becomes impossible to frame them.

Japanese patent application laid-open No.2-082765 (1990) disclose a multi-image display control circuit. But, in this, circuit, it is not clear whether the size of frame can be set or not. From the example of the specification, it is assumed that it is fixed.

Japanese patent application laid-open No.5-204374 (1993) discloses an image display control system. Since there is no description about frame, this system simply relates to a picture-in-picture technology.

Japanese patent application laid-open No.5-346773 (1993) discloses an overlap-display control method for multiple moving pictures. In this method, display area designation memories (RM0, RM1, . . . ) are provided. Therefore, to designate a display area, amount of memory equal to the display area is required. Also, when changing the position of display image, it is necessary to rewrite a large amount of display area memory.

Japanese patent application laid-open No.10-322619 (1998) discloses an image display unit. The object of this unit is to frame the main image. In framing, it is necessary to set the position of frame. Therefore, the number of values to be set increases by that much.

SUMMARY OF THE INVENTION

Accordingly, it is an object of the invention to provide a picture frame generating circuit that the change of picture position, picture size and frame size can be achieved with less data renewal, thereby reducing the bus occupancy time in renewing data.

It is a further object of the invention to provide a digital television system that offers a quicker response speed to the TV viewer.

According to the invention, a picture frame generating circuit, comprises:

a coordinate value calculation processor that calculates frame start position (X), frame start position (Y), picture end position (X), picture end position (Y), frame end position (X) and frame end position (Y) using calculation start signal as activation signal, based on picture position (X) register, picture position (Y) register, picture size (X) register, picture size (Y) register and frame size register which are written through a data bus, the processor allowing frame color data to be written into frame color register to designate the color of frame through the data bus; and a selection circuit of frame and picture to which the frame start position (X), the frame start position (Y), the picture end position (X), the picture end position (Y), the frame and position (X), the frame end position (Y), the picture position (X) register, picture position (Y) register, the frame color data, picture data, horizontal display position and vertical display position are input, the circuit selecting the picture data or the frame color data and outputs the selected one as display data.

According to another aspect of the invention, a digital television system, comprises:

a CPU that writes a necessary value into a register of a display unit control circuit through a data bus:

an image memory that stores picture data and frame;

the display unit control circuit that is composed of a picture frame generating circuit that switches, based on the value of the register, the picture data and frame stored in the image memory and outputs the selected one as display data; and a display unit that displays the display data.

BRIEF DESCRIPTION OF THE DRAWINGS

The invention will be explained in more detail in conjunction with the appended drawings, wherein.

DESCRIPTION OF THE PREFERRED EMBODIMENTS

First Embodiment

Figure 1:
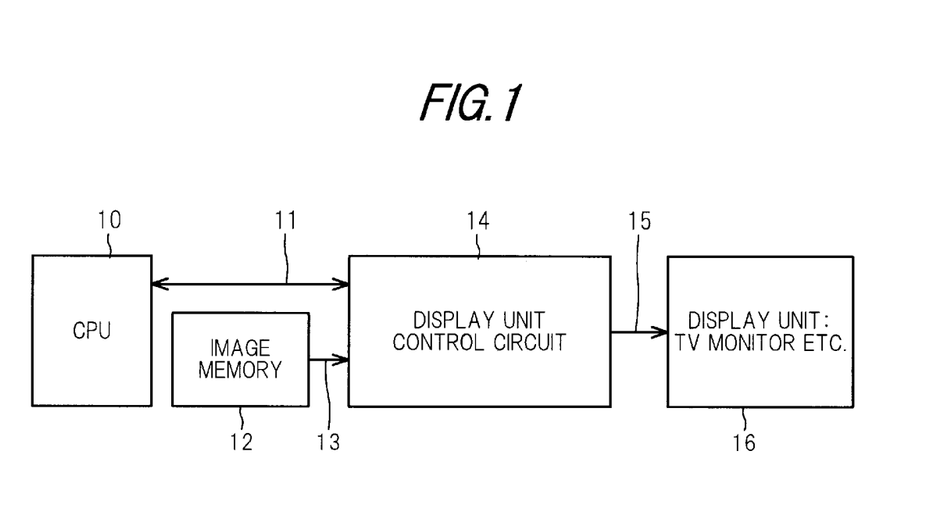
FIG. 1 is a block diagram showing the composition of a digital television system using a picture frame generating circuit according to the invention.

FIG. 1 is a block diagram showing the composition of a digital television system using a picture frame generating circuit according to the invention. A CPU 10 writes necessary values, through a data bus 11, into registers of a display unit control circuit 14 including the picture frame generating circuit according to the invention. The display unit control circuit 14, based on the values, outputs switching picture data 13 stored in an image memory 12 and frame, as display data 15, to a display unit 16 such as a TV monitor.

Figure 2:
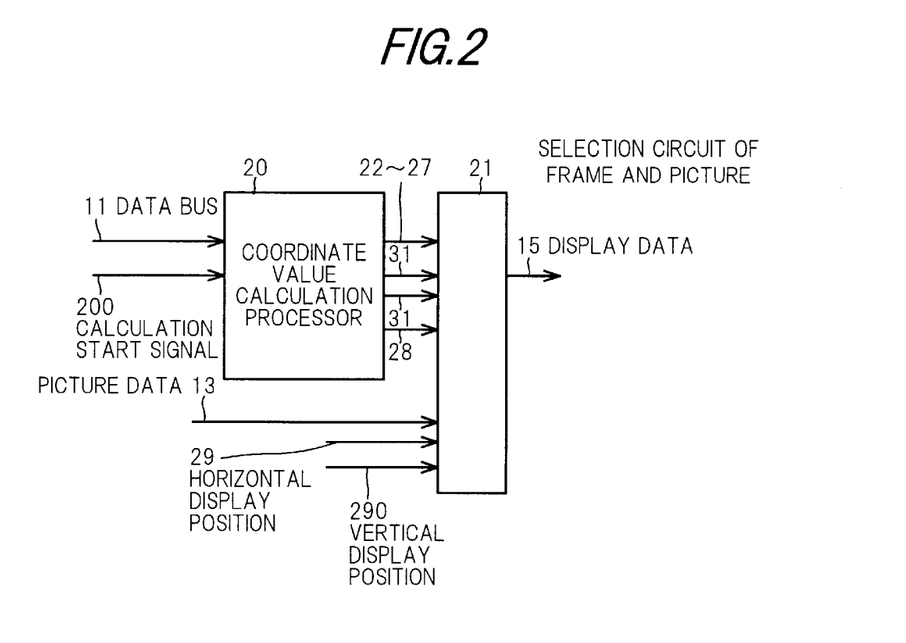
FIG. 2 is a block diagram showing the composition of a picture frame generating circuit in a first preferred embodiment according to the invention.

FIG. 2 is a block diagram showing a picture frame generating circuit in the first preferred embodiment according to the invention. A coordinate value calculation processor 20, using calculation start signal 200 as activation signal, calculates frame start position (X) 22, frame start position (Y) 23, picture end position (X) 24, picture end position (Y) 25, frame end position (X) 26, and frame end position (Y) 27 based on picture position (X) register 30, picture position (Y) register 31, picture size (X) register 32, picture size (Y) register 33, and frame size register 34 which are written through the data bus 11. Also, frame color data are written into frame color register 35 to designate the color of frame through the data bus 11.

The frame start position (X) 22, frame start position (Y) 23, picture end position (X) 24, picture end position (Y) 25, frame end position (X) 26, frame end position (Y) 27, picture position (X) register 30, picture position (Y) register 31, frame color data 28, picture data 13, horizontal display position 29, and vertical display position 290 are input to a selection circuit 21 of frame and picture, which selects the picture data 13 or frame color data 28 and outputs it as display data 15.

Figure 3:
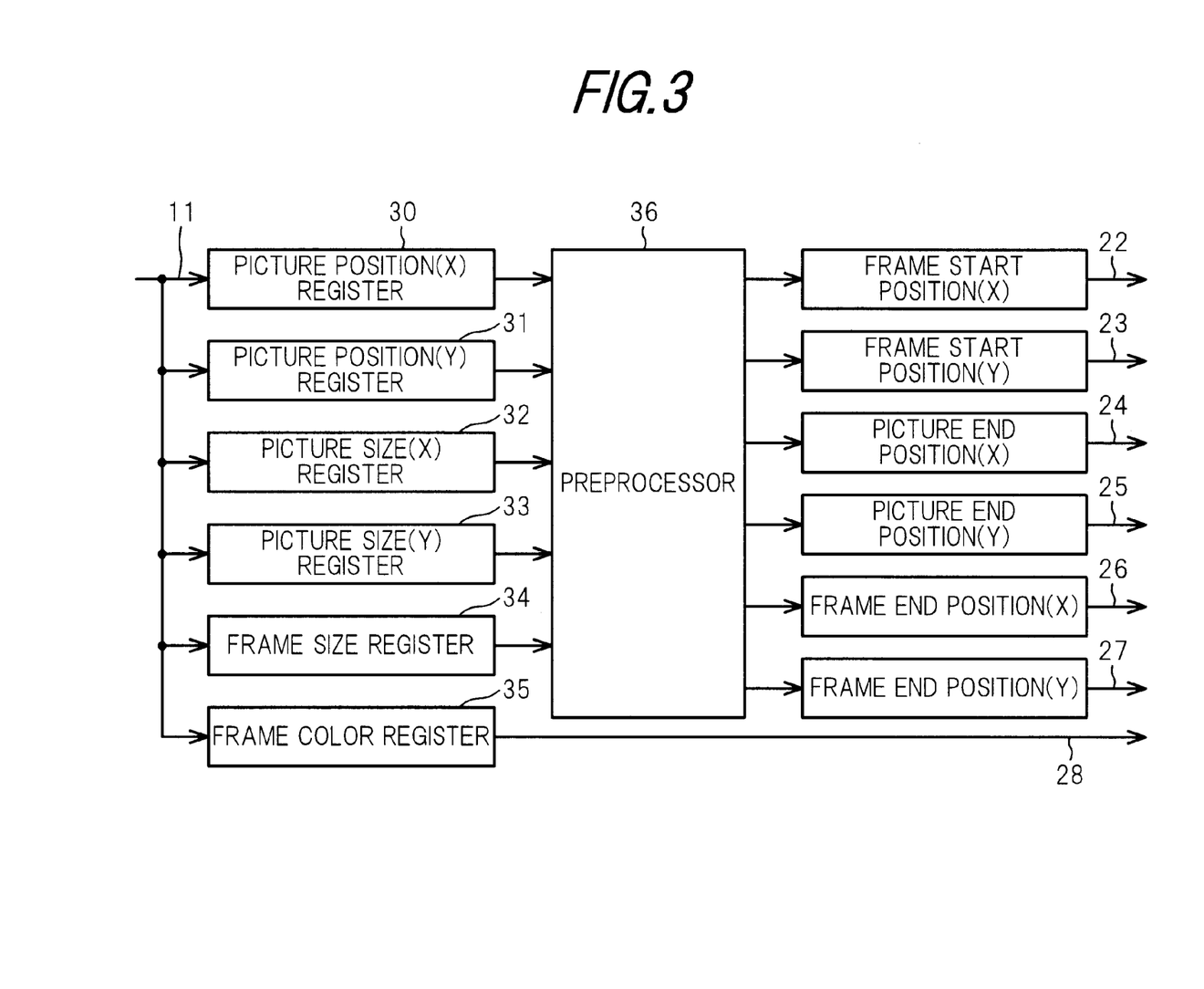
FIG. 3 is a block diagram showing the function of a preprocessor 36 of a coordinate value calculation processor 20 in FIG. 2.

FIG. 13 is a block diagram showing the function of a preprocessor 36 of the coordinate value calculation processor 20 in FIG. 2. The output of registers, i.e., picture position (X) register 30, picture position (Y) register 31, picture size (X) register 32, picture size (Y) register 33 and frame size register 34 are input to the preprocessor 36. Then the preprocessor 36 calculates therefrom.

Figure 4:
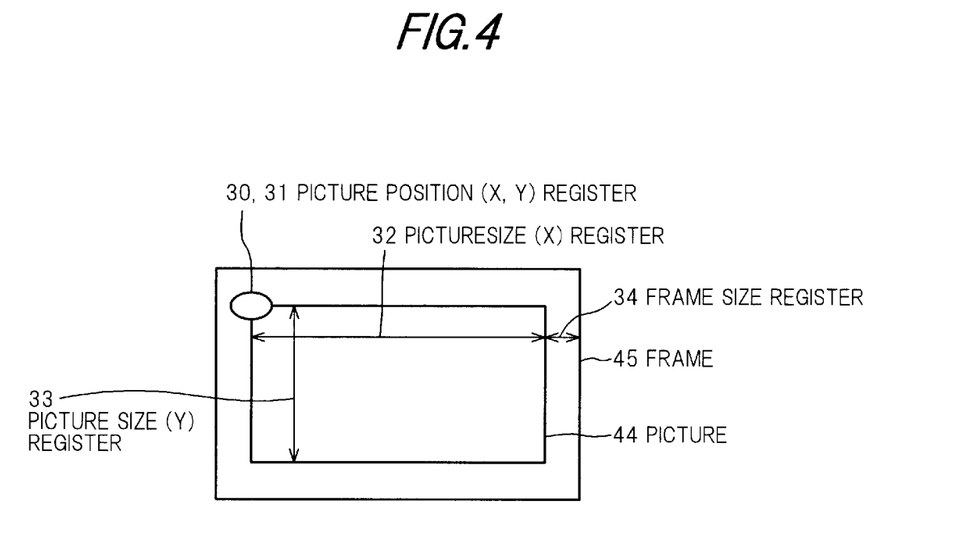
FIG. 4 is an illustration showing the display-position relation among values written through a data bus 11, a picture and a frame.

FIG. 4 shows the display-position relation among values written through the data bus 11, a picture 44 and a frame 45.

Figure 5:
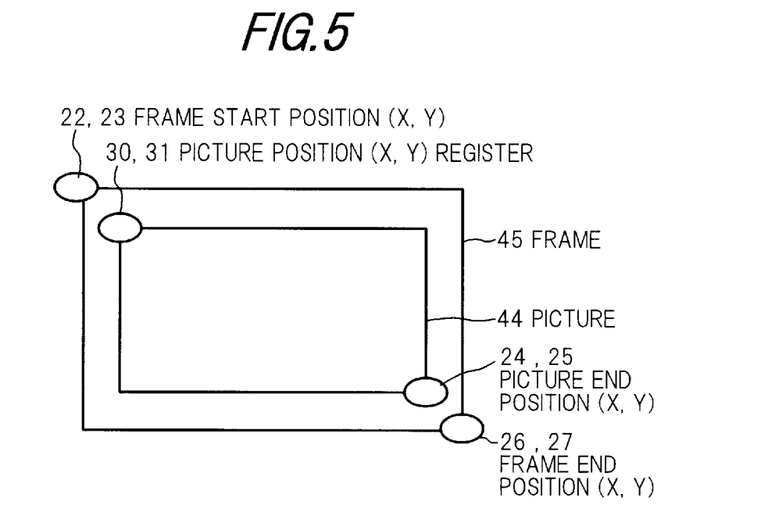
FIG. 5 is an illustration showing the display-position relation among values calculated, a picture and a frame.

FIG. 5 shows the display-position relation among values calculated, a picture 44 and a frame 45.

Figure 6:
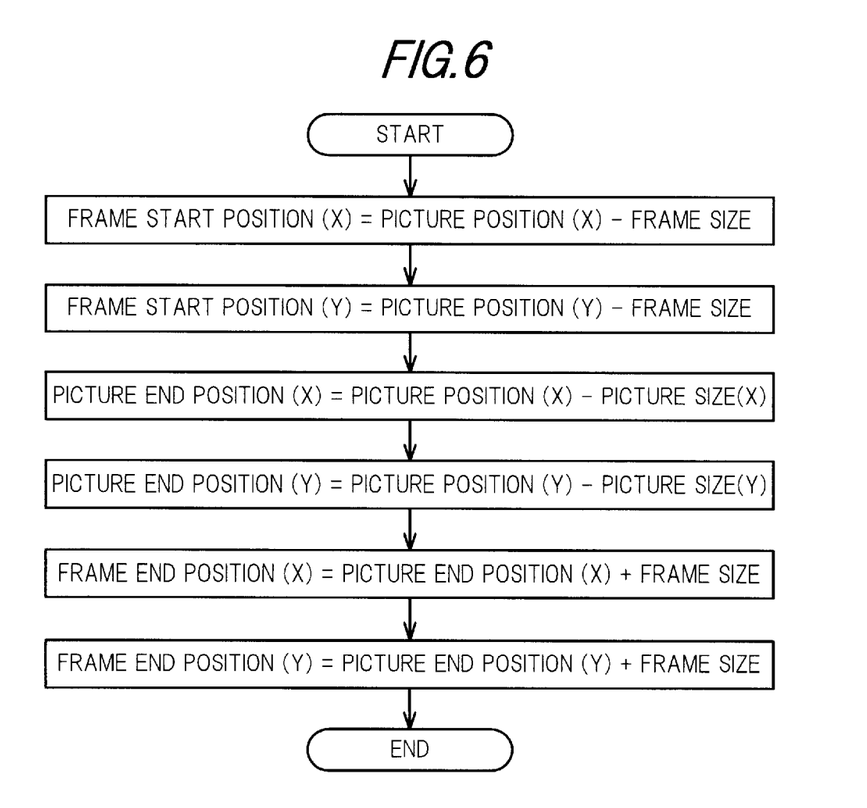
FIG. 6 is a flow chart showing the calculation process of the preprocessor 36 in FIG. 3.

FIG. 6 is a flow chart showing the calculation process by the preprocessor 36, which calculates the frame start position (X) 22, frame start position (Y) 23, picture end position (X) 24, picture end position (Y), frame end position (X) 26 and frame end position (Y) 27.

Figure 7:
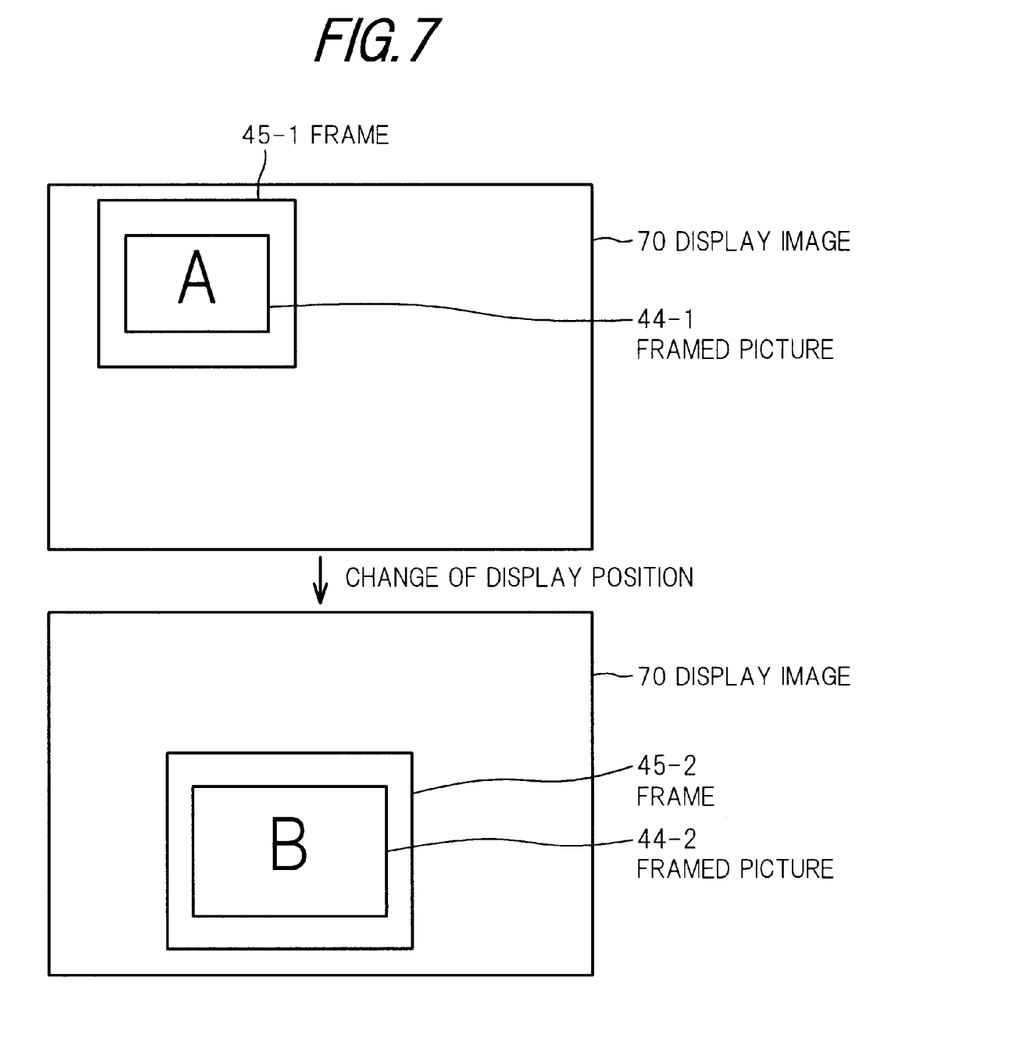
FIG. 7 is an illustration showing a display image of framed picture and another display image of framed picture obtained by changing the display position and size of the framed picture.

FIG. 7 shows a display image 70 of frame picture 44-1 and a display image 71 of framed picture 44-2 obtained by changing the display position and size of the frame picture 44-1, 45-1 and 45-2 are frames.

Figure 8:
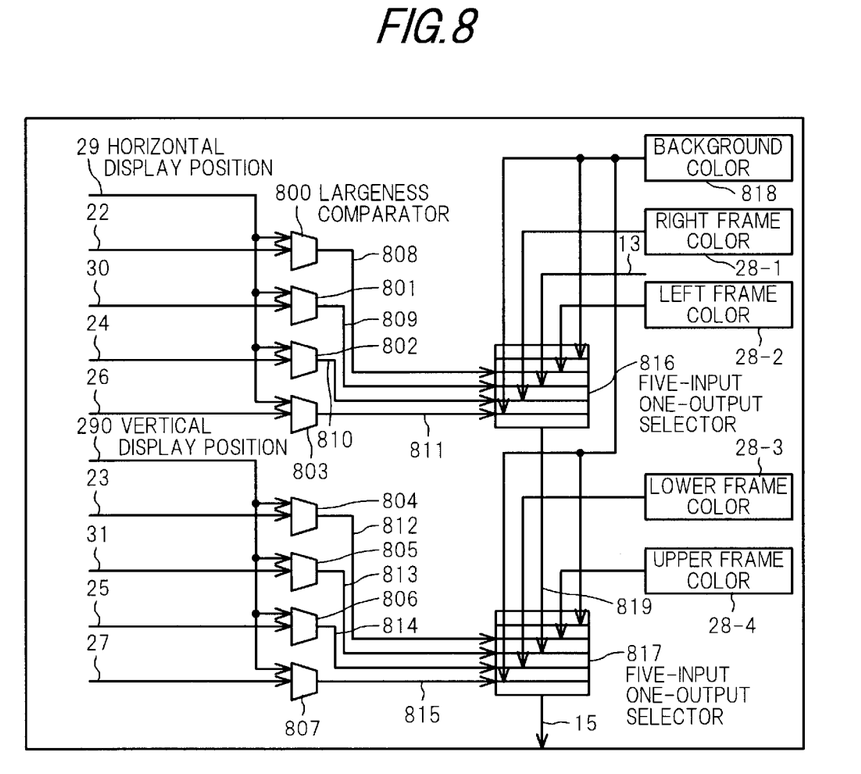
FIG. 8 is a block diagram showing a compositional example of selection circuit 21 of frame and picture in FIG. 2.

FIG. 8 is a block diagram showing a compositional example of the selection circuit 21 of frame and picture. 800 to 807 are largeness comparators. The largeness comparison results 808 to 815 become select signal for five-input one-output selectors 816 and 817, 819 is the output of the five-input one-output selector 816.

Figure 9:
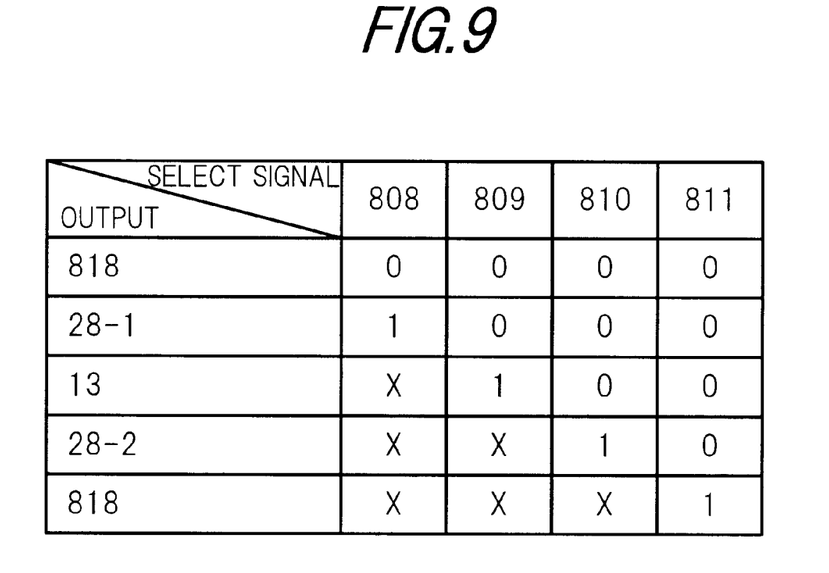
FIG. 9 is a truth table of a five-input one-output selector 816 in FIG. 8.

FIG. 9 shows a truth table of the five-input one-output selector 816.

Figure 10:
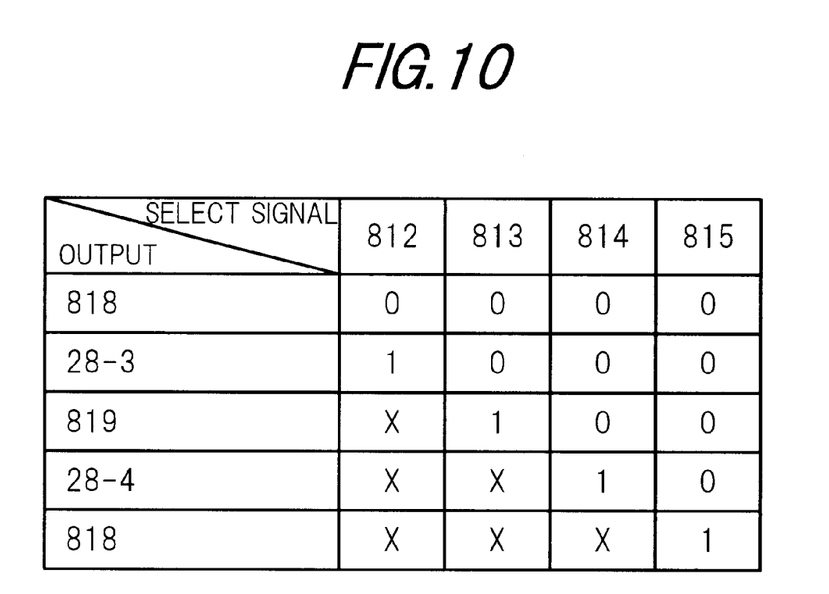
FIG. 10 is a truth table of a five-input one-output selector 817 in FIG. 8.

FIG. 10 shows a truth table of the five-input one-output selector 817.

Figure 11:
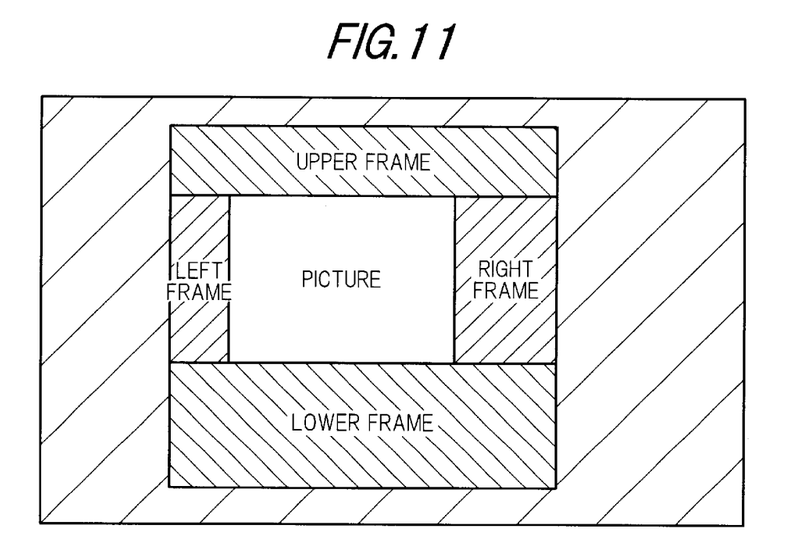
FIG. 11 is an illustration showing an example of display in a case that the frame size varies between the upper and lower frames and between the right and left frames.

FIG. 11 shows an example of display in a case that the frame size varies between the upper and lower frames and between the right and left frames.

Figure 12:
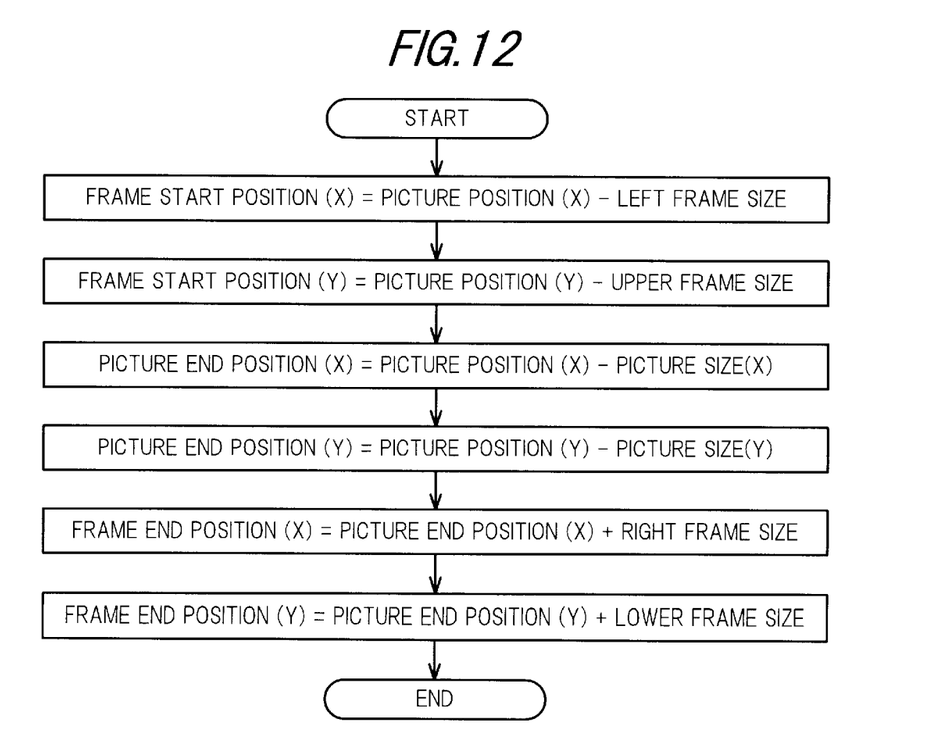
FIG. 12 is a flow chart showing the calculation process of the preprocessor 36 in FIG. 3 based on different sizes of frame.

FIG. 12 is a flow chart showing the calculation process of frame start position (X) 22, frame start position (Y) 23, picture end position (X) 24, picture end position (Y) 25, frame end position (X) 26 and frame end position (Y) 27 in FIG. 3 based on the different sizes of frame.

Figure 13:
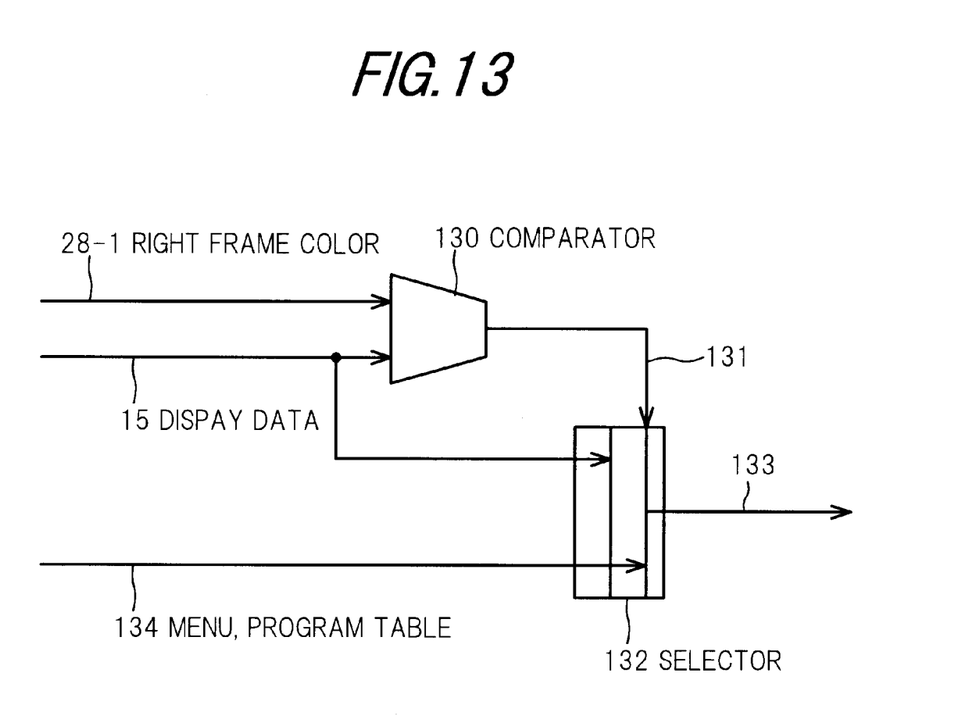
FIG. 13 is a block diagram showing an example of circuit for attaching a menu or a program table to an area for right frame color.

FIG. 13 is a block diagram showing an example of circuit for attaching a menu or a program table to an area for right frame color, 130 is a comparator and 131 is the output of the comparator 130, which outputs "1" when the comparison result coincides each other. 132 is a selector for switching display area 15 and menu or program table 134. When the output 131 of the comparator 130 is "1", the menu or program table 134 is output as a selector output 133. When the output 131 of the comparator 130 is "0", the display data 15 is output as that.

The operation of the circuit in FIG. 2 is explained below.

When the calculation start signal 200 comes to an active level, the preprocessor 36, according to the flow chart in FIG. 6, calculates newly six values, i.e., frame start position (X) 22, frame start position (Y) 23, picture end position (X) 24, picture end position (Y) 25, frame end position (X) 26 and frame end position (Y) 27 from picture position (X) register 30, picture position (Y) register 31, picture size (X) register 32, picture size (Y) register 33 and frame size register 34 which are written through the data bus 11. As a result, eight values, which enable the picture and frame to be switched, frame start position (X) 22, frame start position (Y) 23, picture end position (X) 24, picture end position (Y) 25, frame end position (X) 26, frame end position (Y) 27, picture position (X) register 30, and picture position (Y) register 31 are obtained. Then, these values are input to the selection circuit 21 of frame and picture, which compares the eight values with the horizontal display position 29 and vertical display position 290, selects the frame color data 28 or picture data 13 and outputs it as display data 15.

In FIG. 8, the operation of the selection circuit 21 of frame and picture is explained below.

The largeness comparators 800 to 803 compare the frame start position (X) 22, picture position (X) register 30, picture end position (X) 24 and frame end position (X) 26 with the horizontal display position 29. When the horizontal display position 29 is larger, the largeness comparator outputs 800 to 811 are "1". The five-input one-output selector 816 uses the largeness comparator outputs 808 to 811 as select signal. The relation of select signal and output 819 is as shown by the truth table in FIG. 9. The largeness comparators 804 to 807 compare the frame start position (Y) 23, picture position (Y) register 31, picture end position (Y) 25 and frame end position (Y) 27 with the vertical display position 290. When the vertical display position 290 is larger, the largeness comparator outputs 812 to 815 are "1".

The five-input one-output selector 817 uses the largeness comparator outputs 812 to 815 as select signal. The relation of select signal and output 15 is as shown by the truth table in FIG. 10. The display data 15, the output of the selection circuit 21 of frame and picture, is input to the display unit 16 such as a TV monitor. When the display position and size of picture is changed, the four registers of picture position (X) register 30, picture position (Y) register 31, picture size (X) register 32 and picture size (Y) register 33 are changed through the data bus 11. After calculation start signal 200 comes to the active level, the preprocessor 36 again executes the flow chart in FIG. 6, renews the frame start position (X), 22, frame start position (Y) 23, picture end position (X) 24, picture end position (Y) 25, frame end position (X) 26 and frame end position (Y) 27. The example of display before and after the renewal is as shown in FIG. 7.

Background color 818 in FIG. 8 is a value to be set already in the display unit control circuit 14. Right frame color 28-1, left frame color 28-2, lower frame color 28-3 and upper frame color 28-4 are frame color data written in the frame color register 35.

Second Embodiment

FIG. 11 shows an example of display in the case that the upper, lower, right and left frames, which are attached to the picture, are set to have different sizes. FIG. 12 is the flow chart for calculating the frame start position (X) 22, frame start position (Y) 23, picture end position (X) 24, picture end position (Y) 25, frame end position (X) 26 and frame end position (Y) 27 in FIG. 3, based on the different frame sizes. The difference from the flow chart in FIG. 6 is only that the frame size is changed into the sizes of upper, lower, right and left frames.

Third Embodiment

FIG. 13 illustrates the third preferred embodiment of the invention. If display data 15 coincide with right frame color, the output of the comparator 130 is "1". The selector 132 outputs, instead of display data 15, the menu or program table 134 to the display unit 16 such as a TV monitor. If it is other than right frame color, the selector 132 outputs the display data 15 to the display unit 16 such as a TV monitor. In this embodiment, in attaching the menu or program table to the right side of picture, even when the position or size of picture changes, the display position of the menu or program table is changed corresponding to the change of the position or size of picture. Therefore, the menu or program table can be prevented from overlapping with or separating from the picture.

Fourth Embodiment

Right frame color in the second embodiment can be changed to left frame color. In this case, the display position of menu or program table is changed to the left-frame side.

Fifth Embodiment

Right frame color in the second embodiment can be changed to lower frame color. In this case, the display position of menu or program table is changed to the lower-frame side.

Sixth Embodiment

Right frame color in the second embodiment can be changed to upper frame color. In this case, the display position of menu or program table is changed to the upper-frame side.

Advantages of the Invention:

In a case that multiple pictures of arbitrary sizes are displayed attached with a frame of an arbitrary size, changing the position of one picture can be achieved by changing only the two values of picture position (x) and picture position (Y). Also, changing the size of one picture can be achieved by changing only the two values of picture size (x) and picture size (Y). Further, changing the frame size of one picture can be achieved by changing only the one value of frame size.

Due to the above effect, the usage rate of the CPU data bus can be reduced. Thus, the CPU data bus can be assigned to another use, thereby enhancing the function and response speed of a digital television.

Also, the upper, lower, right and left frames attached to a picture can be made to have different sizes, and the upper lower, right and left frame attached to a picture can be made to have different colors.

Also, in the other embodiment, when the picture size or position is changed while the menu or program table is attached to the side of picture, changing the position of the menu or program table attached synchronizing with the change of picture size or display position requires CPU of the quick processing. However, the size of right frame of picture is set to be an area to display the menu or program table and the color of right frame is predetermined, and there is provided the circuit for attaching the menu or program table to the color area. Thereby, even when the position or size of picture changes, the display position of the menu or program table is changed corresponding to the change of the position or size of picture. Therefore, the menu or program table can be prevented from overlapping with or separating from the picture.

Also, since the load CPU in real-time processing is reduced, the power of CPU can be used for the other processing by that amount reduced. As a result, the performance of the entire unit can be enhanced.

Although the invention has been described with respect to specific embodiment for complete and clear disclosure, the appended claims are into to be thus limited but are to be construed as embodying all modification and alternative constructions that may be occurred to one skilled in the art which fairly fall within the basic teaching here is set forth.

What is claimed is:

1. A picture frame generating circuit, comprising:
   a coordinate value calculation processor that calculates frame start position (X), frame start position (Y), picture end position (X), picture end position (Y), frame end position (X) and frame end position (Y) using calculation start signal as activation signal, based on picture position (X) register, picture position (Y) register, picture size (X) register, picture size (Y) register and frame size register which are written through a data bus, said processor allowing frame color data to be written into frame color register to designate the color of frame through said data bus; and a selection circuit of frame and picture to which said frame start position (X), said frame start position (Y), said picture end position (X), said picture end position (Y), said frame end position (X), said frame end position (Y), data being inputted through said data bus to said picture position (X) register and said picture position (Y) register, said frame color data, picture data, horizontal display position and vertical display position are input, said circuit selecting said picture data or said frame color data and outputs the selected one as display data.

2. A picture frame generating circuit, according to claim 1, wherein:

said coordinate value calculation processor includes a preprocessor to which data being inputted through said data bus to said picture position (X) register, said picture position (Y) register, said picture size (X) register, said picture size (Y) register and said frame size register are input, and which then calculates said frame start position (X), said frame start position (Y), said picture end position (X), said picture end position (Y), said frame end position (X), and said frame end position (Y).

3. A picture frame generating circuit, according to claim 1, wherein:

said selection circuit of frame and picture is composed of a plurality of first largeness comparators, a plurality of second largeness comparators, a first five-input one-output selector and a second five-input one-output selector;

said plurality of first largeness comparators each compare said frame start position (X), said picture position (X) register, said picture end position (X) and said frame end position (X) with said horizontal display position, and when said horizontal display position is larger, said plurality of first largeness comparators each output "1", said first five-input one-output selector using the output of each of said plurality of first largeness comparators as select signal, the relation between said select signal and the output of said first five-input one-output selector being based on a predetermined truth table; and said plurality of second largeness comparators each compare said frame start position (Y), said picture position (Y) register, said picture end position (Y) and said frame end position (Y) with said vertical display position, and when said vertical display position is larger, said plurality of second largeness comparators each output "1", said second five-input one-output selector using the output of each of said plurality of second largeness comparators as select signal, the relation between said select signal and the output of said second five-input one-output selector being based on a predetermined truth table.

4. A picture frame generating circuit, according to claim 1, wherein:

said frame size register is set so that the upper, lower, right and left frames have different sizes.

5. A picture frame generating circuit, according to claim 1, further comprising:

a circuit that is composed of a comparator which compares frame color data and display data, and selector which switches the display data and a menu or program table;

wherein said comparator outputs "1" if the comparison result coincides each other and outputs "0" if the comparison result does not coincide, said selector outputs said menu or program table to the selector output if the output of said comparator is "1" and outputs said display data to the selector output if the output of said comparator is "0", so that said menu or program table is attached to the area of upper, lower, right or left frame.

6. A digital television system, comprising:

a CPU that writes a necessary value into a register of a display unit control circuit through a data bus;

an image memory that stores picture data and frame;

said display unit control circuit being composed of a picture frame generating circuit that switches, based on the value of said register, the picture data and frame stored in said image memory and outputs the selected one as display data; and a display unit that displays the display data;

wherein said picture frame generating circuit comprises:

a coordinate value calculation processor that calculates frame start position (X), frame start position (Y), picture end position (X), picture end position (Y), frame end position (X) and frame end position (Y) using calculation start signal as activation signal, based on picture position (X) register, picture position (Y) register, picture size (X) register, picture size (Y) register and frame size register which are written through a data bus, said processor allowing frame color data to be written into frame color register to designate the color of frame through said data bus; and a selection circuit of frame and picture to which said frame start position (X), said frame start position (Y), said picture end position (X), said picture end position (Y), said frame end position (X), said frame end position (Y), data being inputted through said data bus to said picture position (X) register and said picture position (Y) register, said frame color data, data, picture data, horizontal display position and vertical display position are input, said circuit selecting said picture data or said frame color data and outputs the selected one as display data.

* * * * *